US007853717B2

(12) United States Patent
Petrovykh

(10) Patent No.: US 7,853,717 B2
(45) Date of Patent: *Dec. 14, 2010

(54) SYSTEM AND APPARATUS FOR PRE-ROUTING NETWORK EVENTS

(75) Inventor: Yevgeniy Petrovykh, Walnut Creek, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/331,666

(22) Filed: Dec. 10, 2008

(65) Prior Publication Data

US 2009/0089451 A1 Apr. 2, 2009

Related U.S. Application Data

(60) Continuation of application No. 11/856,603, filed on Sep. 17, 2007, now Pat. No. 7,610,347, which is a continuation of application No. 10/079,328, filed on Feb. 19, 2002, now Pat. No. 7,272,627, which is a continuation-in-part of application No. 09/599,045, filed on Jun. 21, 2000, now Pat. No. 6,453,341, which is a division of application No. 08/998,268, filed on Dec. 24, 1997, now Pat. No. 6,128,646, which is a division of application No. 08/795,680, filed on Feb. 6, 1997, now Pat. No. 5,765,033.

(51) Int. Cl.
*G06F 15/16* (2006.01)

(52) U.S. Cl. .................................. 709/240; 379/265.02
(58) Field of Classification Search ......... 709/200–202, 709/238, 240; 379/265.01, 265.02, 265.11, 379/265.12, 265.13, 265.14, 266.01, 266.02, 379/266.03
See application file for complete search history.

(56) References Cited

U.S. PATENT DOCUMENTS

| 7,039,176 | B2 * | 5/2006 | Borodow et al. | 379/265.02 |
| 7,106,850 | B2 * | 9/2006 | Campbell et al. | 379/265.09 |
| 7,272,627 | B2 * | 9/2007 | Petrovykh | 709/201 |
| 7,428,303 | B2 * | 9/2008 | Campbell et al. | 379/265.09 |

* cited by examiner

*Primary Examiner*—Moustafa M Meky
(74) *Attorney, Agent, or Firm*—Donald R. Boys; Central Coast Patent Agency, Inc.

(57) ABSTRACT

A pre-routing software system for treating incoming network events according to event importance prior to agent-level routing in a communication center network is disclosed. The system includes at least one network interface for receiving incoming events, a parsing engine for parsing electronic messages and documents, at least one communication interface for enabling communication with connected routing, queuing, and automated response systems, and a determination module for determining pre-treatment of received events. In preferred application, incoming network events are parsed according to a rules set and determination of pre-treatment is made for each event according to the rules set. In some embodiments, the system is used in conjunction with one or more virtual, priority-based queuing systems.

20 Claims, 5 Drawing Sheets

SYSTEM AND APPARATUS FOR PRE-ROUTING NETWORK EVENTS

CROSS-REFERENCE TO RELATED DOCUMENTS

The present patent application is a Continuation of co-pending patent application Ser. No. 11/856,603, filed on Sep. 17, 2007, which is a Continuation of patent application Ser. No. 10/079,328, filed on Feb. 19, 2002 and issued as U.S. Pat. No. 7,272,627 on Sep. 17, 2007, which is a Continuation In Part (CIP) to a patent application, Ser. No. 09/599,045 entitled, "System For Routing Electronic Mails", filed on Jun. 21, 2000 and issued as U.S. Pat. No. 6,453,341 on Sep. 17, 2002, which is a divisional application of patent application, Ser. No. 08/998,268, filed on Dec. 24, 1997 and issued as U.S. Pat. No. 6,128,646 on Oct. 3, 2000 which is a divisional application of Ser. No. 08/795,680, filed on Feb. 6, 1997 and issued as U.S. Pat. No. 5,765,033 on Jun. 9, 1998. The prior applications are incorporated herein in their entirety by reference.

BACKGROUND OF THE INVENTION

1. Field of the Invention

The present invention relates to pre-routing of network-based communication events and pertains particularly to methods and apparatus for pre-routing based on real-time determination of importance of events and of agent availability status.

2. Discussion of the State o the Art

Electronic mail (e-mail) has recently become one of the most commonly used communication tools in business. And, as more and more homes are connected to the Internet, Electronic mail is becoming an important communication tool for the home user.

In the simplest case, electronic mail is the delivery of text-based messages from a sending computer to one or more recipient computers. The sending and recipient computers are connected to a data network. Typically, the message is temporarily stored in a server of the data network. The recipient computers (users) can retrieve the stored messages at their convenience.

Although many companies recognize the benefits including efficiency of electronic mail, e-mail systems have been commonplace for a relatively short period of time and many companies have yet to implement e-mail systems. This is largely because e-mail systems in the past were proprietary systems. Messages can only be delivered in such systems if the senders and recipients use the same proprietary system. The proprietary nature of these e-mail systems means that each system can only be accessed by persons associated with the same organization (such as a company or an on-line service provider). It is very difficult to send messages to an intended recipient outside of the system. Thus, a message can only reach a relatively small number of computers (i.e., users). Unless the company has many employees, the costs of setting up an e-mail system may be much higher than the anticipated benefits.

With the continued improvement and expansion of the Internet network and pervasive use thereof by both business and a growing number of home users, it is clear that much improvement could be realized through e-mail efficiency. The Internet also offers many resources in addition to e-mails. Each user of the Internet is assigned an e-mail address that is recognizable around the world. A computer connected to the Internet can send e-mails to any one of these email addresses. As a result, it is possible to communicate electronically with many people at any time.

As a result of the popularity and convenience of e-mails, many companies allow their customers to send comments and request information and services using e-mails. Typically, these companies set up one or more specific e-mail addresses for these purposes. These mails are typically answered on a first come first serve basis.

The inventor knows of a system for routing electronic mails to any one of a plurality of support persons in a processing or communication center. Each person in the center has a particular skill set rating that is suitable for responding to a certain type or class of e-mails. The system comprises an e-mail server for receiving the e-mail from a sender, an information extractor for extracting relevant information from the e-mail, and a router for routing the e-mail. The system contains a database for storing information related to all persons who can answer e-mails. The system also contains a server for storing the history of all activities in the system. The router can make routing decisions and perform load-balancing and alert functions based on the information stored in the database and the server.

In a communication center or other organized communication environment, e-mail routing systems along with conventional telephony and IP routing systems can be made somewhat intelligent with respect to load balancing, skill-set routing, and other conventions dealing with virtually any media type. However, in all routing systems, overloading with respect to message overload in queue can pose a significant challenge in providing timely service to those calling into the center. For example, in a communication center wherein agents deal with multiple media types, response times may vary for the different types. It is important for example that high-priority e-mails are answered in a timely manner, but not at the expense of equally high priority phone calls and event of other media types.

Because a wide variety of different media types and typical response-time requirements exist in a multimedia agent's work environment, it becomes important to balance and prioritize the workload among the varied media types while still remaining within acceptable response times for media types involved. Prior-art routing systems do not provide a method for optimizing media-mixed response scenarios for center agents or agent groups for that matter.

Therefore what is clearly needed is a system and method for pre-routing messages as a precursory step to actual routing routines wherein pre-responses may be sent to lower priority messages leaving higher priority messages to actual agent level routing and treatment.

SUMMARY OF THE INVENTION

In a preferred embodiment of the present invention a pre-routing software system for treating incoming network events according to event importance prior to agent-level routing in a communication center network is provided, comprising at least one network interface for receiving incoming events, a parsing engine for parsing electronic messages and documents, at least one communication interface for enabling communication with connected routing, queuing, and automated response systems, and a determination module for determining pre-treatment of received events. The system is characterized in that the incoming network events are parsed according to a rules set and wherein determination of pre-treatment is made for each event according to the rules set.

In one embodiment the communication-center network comprises two or more communication centers linked for communication and the pre-routing is performed in the network. Also in an embodiment the communication-center network is internal to a single communication center and the pre-routing is performed within the communication center.

Still further in an embodiment the communication-center network is internal to a single communication center and a pre-routing is performed externally from the communication center.

In still another embodiment of the system, network events include e-mail, instant messages, electronic faxes, electronic documents, Internet protocol telephony events, automated transfer machine events, Internet protocol video-enhanced events, and electronic notifications of connection-oriented-switched-telephony events. The queuing system may be a virtual queuing system. In some cases the automated response systems include an automated fax system, and automated e-mail system, and an automated interactive-voice-response system. In these and other cases pre-treatment options may include dropping the event, routing to an automated response system, and routing to a live agent.

In another aspect of the invention a pre-routing server for determining treatment of incoming network events to a communication-center network prior to agent-level routing is provided, comprising at least one input port for receiving the events, at least one communications port for communicating to external and connected systems of the communication-center network, and an instance of pre-routing software for parsing the network events and for determining treatment for each event based on the results of parsing. The server is characterized in that according to importance level of each event as determined through parsing results according to a set of rules, events are either terminated, routed to automated response systems, or routed to communication center agents.

In some embodiments of the server the communication-center network comprises two or more communication centers linked for communication and wherein the pre-routing is performed in the network. In other embodiments the communication-center network is internal to a single communication center and the pre-routing is performed within the communication center. In still other embodiments the communication-center network is internal to a single communication center and a pre-routing is performed externally from the communication center.

In still other embodiments of the network events include e-mail, instant messages, electronic faxes, electronic documents, Internet protocol telephony events, automated transfer machine events, Internet protocol video-enhanced events, and electronic notifications of connection-oriented-switched-telephony events. The automated response systems may include an automated fax system, and automated e-mail system, and an automated interactive-voice-response system.

In yet another aspect of the invention a method for pre-routing network events incoming into a communication-center network according to importance level of each event is provided, comprising steps of (a) receiving at least one network event for pre-routing; (b) parsing the event according to a set of rules; (c) determining a treatment option for the event according to results of parsing and application of rules set; and (d) exercising elected treatment option for the event.

In some embodiment of the method in step (a) the network event is one of an e-mail, instant messages, electronic fax, electronic document, Internet protocol telephony event, automated transfer machine event, Internet protocol video-enhanced event, or an electronic notification of a connection-oriented-switched-telephony event. In some embodiments in step (b) the set of rules is predefined and applies to all events. Also in some embodiments in step (b) a set of rules pertains to specific media type. Also in step (b) the set of rules may be dynamic. In some cases in step (c) the treatment options include dropping the event, routing the event to an automated system, or routing the event to a live agent.

In embodiments of the invention described in enabling detail below, for the first time a system and method is provided for pre-routing messages as a precursory step to actual routing routines wherein pre-responses may be sent to lower priority messages leaving higher priority messages to actual agent level routing and treatment.

DETAILED DESCRIPTION OF THE INVENTION

The present invention comprises a novel routing system for electronic mails and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
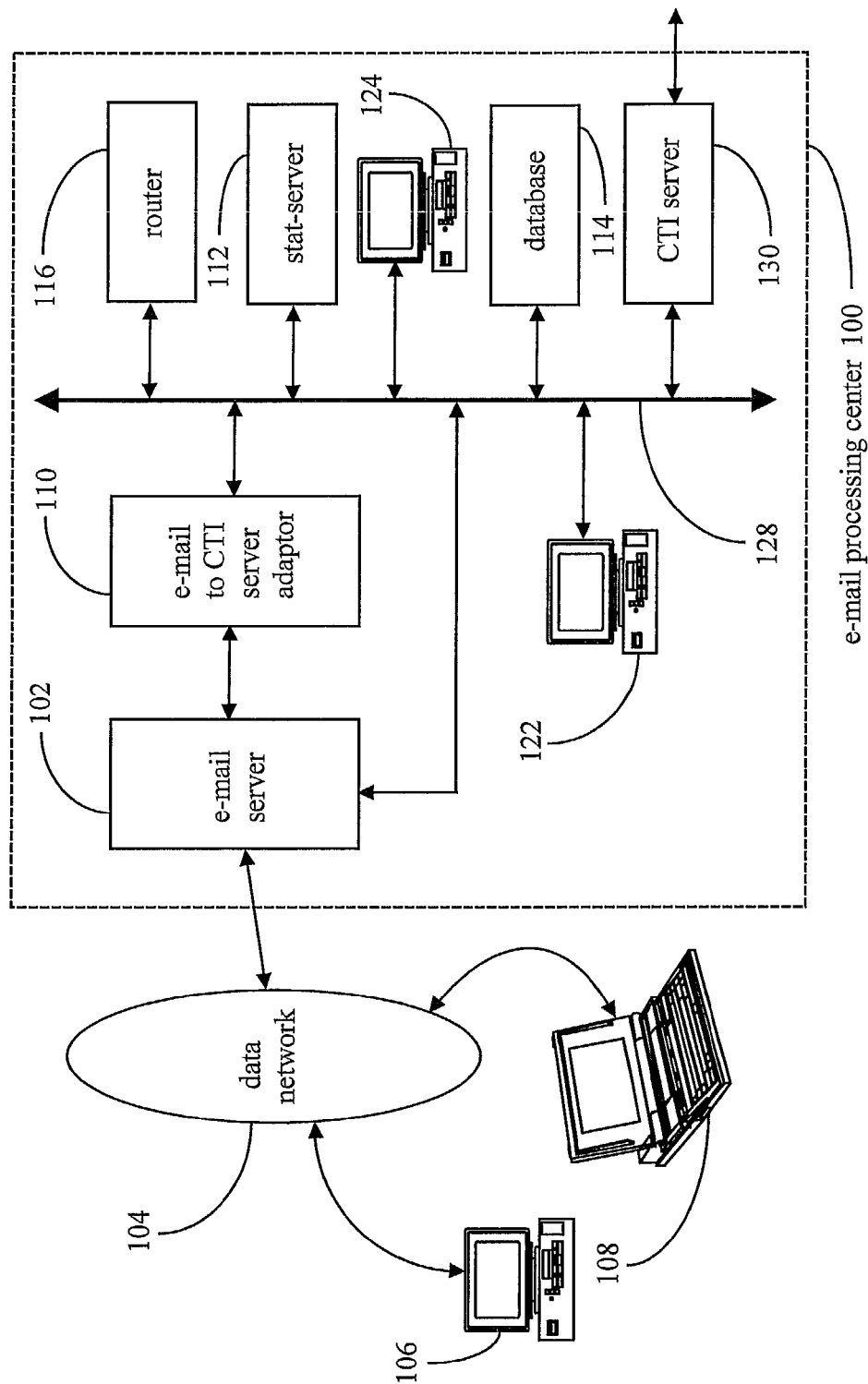
FIG. 1 is a block diagram showing an e-mail processing center of the present invention.

FIG. 1 is a block diagram showing an e-mail processing center 100 of the present invention. Processing center 100 contains an e-mail server 102 which is connected to a data network 104. Data network 104 could be a local area network or a wide-area network (such as the Internet or an intranet). Other data processing devices, such as computers 106 and 108, are also connected to data network 104. All the data processing devices can send e-mails to each other. As a result, some of the e-mails are sent to e-mail server 102.

As an example, it is assumed that one of the addresses associated with e-mail server 102 is "support@abc-company.com". This is an address for customers of a company named "ABC" to send in questions regarding products and services provided by the company. It is anticipated that the subject matter of the e-mails are diverse and the number of mails is large. For example, the e-mails may relate to all aspects of the products and services offered by ABC. Some of the e-mails may contain technical questions of a product. Other e-mails may report a bug in software sold by ABC. A few e-mails may contain suggestions on improving the products and services. If support persons of ABC are assigned to answer some of the e-mails on a first come first served basis, it would be very difficult for them to do so because it is almost impossible for a single person to know everything about ABC.

One aspect of the present invention is a system for automatically routing the e-mails to the most qualified and available support persons. For example, a support person may be an expert in one product of ABC. All e-mails related to this product will be routed to this person automatically. Further, the system can distribute the load so that every support person receives approximately the same number of emails. As a result, the problems of the prior art systems can be solved.

Note that the criteria for determining whether a support person is available is not limited to e-mail activities. This is because the same support person may provide telephone and facsimile support to customer inquiries. Thus, the availability of a support person may involve a combination of activities involving telephone, facsimile, e-mail, data processing, etc.

Processing center 100 contains a server 112 that records all activity in the center. For example, it contains records of who are present in the center at a particular time and are available for service, as well as records of all e-mails that are pending and have been processed by center 100. Server 112 is called herein the "stat-server." It should be noted that many types of information can be recorded, and the choice of information is determined on a case-by-cased basis.

Processing center 100 also contains a database 114 that contains detailed information on each support person, products, and customers. Information of support persons includes their skill set (e.g., product expertise, written language ability) and prior relationship with customers. Information on customers (based on the incoming e-mail address) includes the content of their previous e-mails, the products they bought, their physical addresses (obtained from product registration information), etc.

Processing center 100 also contains a router 116. This router selects the most qualified and available support person to respond to a particular e-mail based on one or more algorithms (or scripts). Various factors in a routing strategy will be described below.

In one embodiment of the present invention, database 114, router 116 and stat-server 112 could be a database, router and stat-server commonly used in telephony call centers. The advantage of this embodiment is that database, router and stat-server software for telephony applications are well developed and widely available. The use of existing software (or slightly modified versions) could speed up product development time. In telephony applications, a server is used to provide computer telephony integration (CTI) by controlling an automatic call distributor (a telephony hardware device for controlling telephone communication between the public telephone networks and telephones inside a call center) and communicating with a database, router and stat-server. This server is called herein the CTI-server. One of the functions of the CTI server is allowing automatic call distributors of different vendors to be used with the same database, router and stat-server.

In this embodiment, a CTI-server 130 and an e-mail-to-CTI-server adapter 110 is preferably included. As explained above, CTI-server 130 provides a common interface for communicating with database 114, router 116 and stat-server 112 via a digital communication network 128. Because these software products are based on telephony applications, some of the attributes used therein may not be exactly the same as that used in e-mail applications. For example, the attribute of "telephone number" in telephony applications is not used in e-mail applications. Similarly, the e-mail attribute of "sender's e-mail address" may not be recognizable in telephony applications. These two attributes have similar characteristics, and can be used interchangeably provided that they are formatted and used properly. One of the functions of adapter 110 is to provide conversion between e-mail attributes and telephony attributes.

Figure 2:
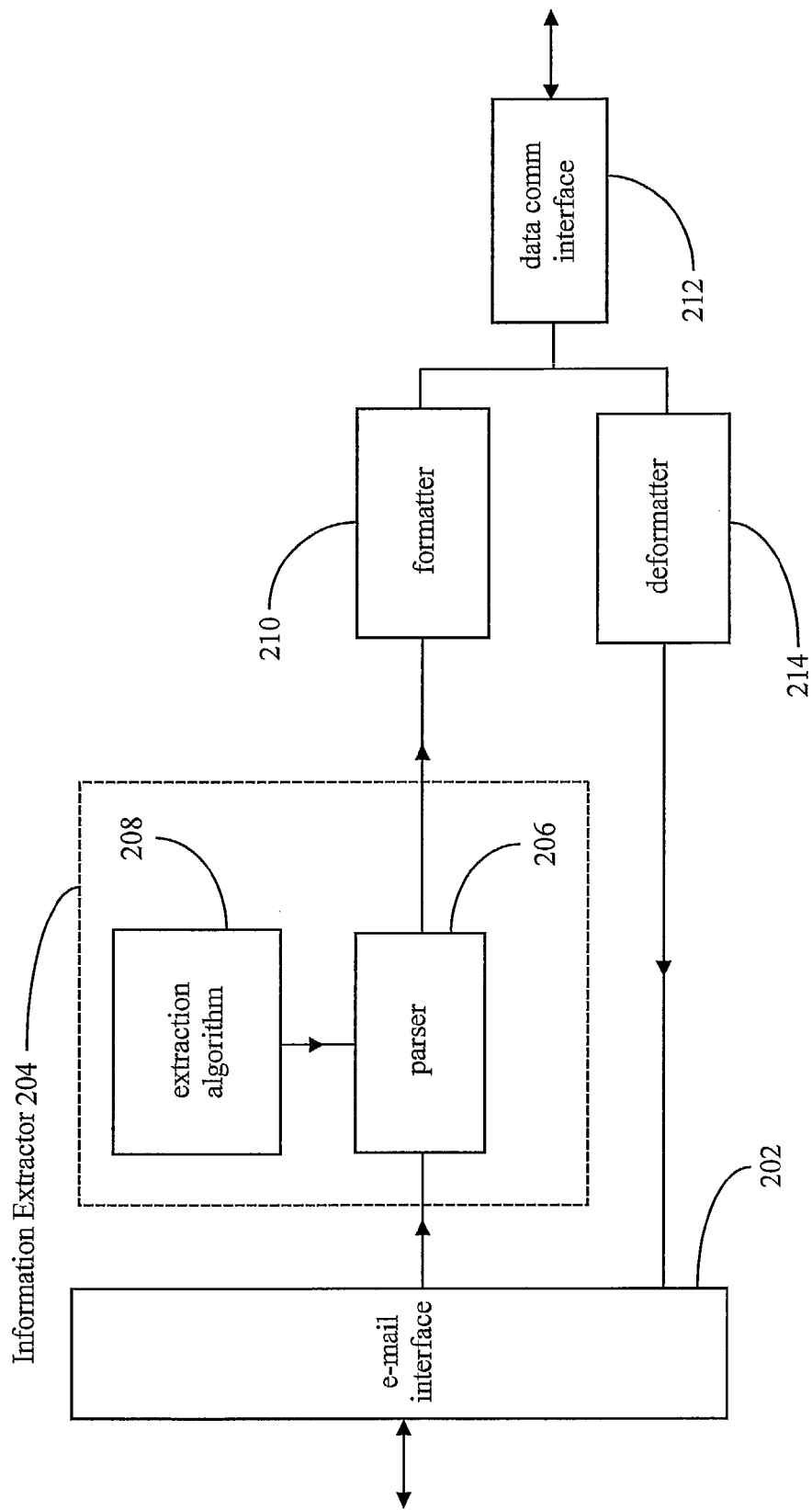
FIG. 2 is a block diagram of an e-mail to CTI server adapter used in the e-mail processing center of the present invention.

FIG. 2 is a block diagram of e-mail-to-CTI-server adapter 110. It includes an e-mail interface 202 for sending data to and receiving data from e-mail server 102. Adapter 110 also includes an information extractor 204 for extracting relevant information from e-mails. Extractor 204 contains a parser 206 for parsing the content of the e-mails obtained from e-mail server 102. Extractor 204 also contains a storage device for storing an algorithm 208 which directs parser 206 to extract appropriate information from the content of the e-mails in accordance with predetermined criteria. The extraction algorithm in extractor 204 is changeable because the coding in algorithm 208 could be changed. Examples of relevant information are:

(a) Addresses: Typically, an e-mail has a portion that contains the addresses of the sender and recipient. Extractor 204 directs parser 206 to extract these e-mail addresses.

(b) Time Stamp: Some e-mail contains the date and time an e-mail is sent. Extractor 204 could direct parser 206 to extract this information. This information may be more accurate than the time e-mail server 102 receives the e-mail because some e-mails may be delayed for more than a day due to network problems.

(c) Keyword: The Extractor may direct the parser to conduct a keyword search on the content of the e-mails. Examples of keywords are name of relevant products and services provided by the company, special words such as "bugs," "virus", "crash" (for software products), "overheat" and "electric shock" (for hardware products), and words of urgent nature (such as "urgent", "ASAP", and "fast").

Adapter 110 contains a formatter 210 for formatting the relevant information into attributes that can be understood by CTI-server 130. As an example, the sender's e-mail address could be formatted as a caller's telephone number (which is a telephony attribute). The formatted attribute is sent to a data communication interface 212 which communicates the attributes to CTI server 130 via communication network 128.

Adapter 110 also contains a deformatter 214 that accepts data and commands from CTI-server 130 and translate them to a form understood by e-mail server 102. As explained below, router 116 may send (via CTI-server 130) commands to e-mail server 102. Returning now to router 116, some examples of support person selection criteria are:

(a) the product expertise of the support person;
(b) language ability of the support person;
(c) activities the support person (e.g., how many e-malls have this person processed and how many are pending);
(d) work load of other support persons in the center (for load balance among various support persons);
(e) the language of the incoming e-mail;
(f) the subject matter of the incoming e-mail;
(g) information about the sender;
(h) overall activities of the center (e.g. whether the support persons need to process jobs other than e-mails); and
(i) the urgency of the matter.

Processing center 100 contains a number of computer terminals, such as computers 122 and 124, managed by support persons. When a support person starts to work, he/she logs in so that stat-server 112 knows who is working in center 100 and how to reach the support person.

Router 116 obtains information to make selection decisions from stat-server 112 and database 114. Once a decision is made, router 116 sends a command to email server 102 to route the e-mail to the selected computer terminal. The support person responds to the e-mail and sends the reply to e-mail server 102, which delivers the reply to the sender via data network 104.

Figure 3:
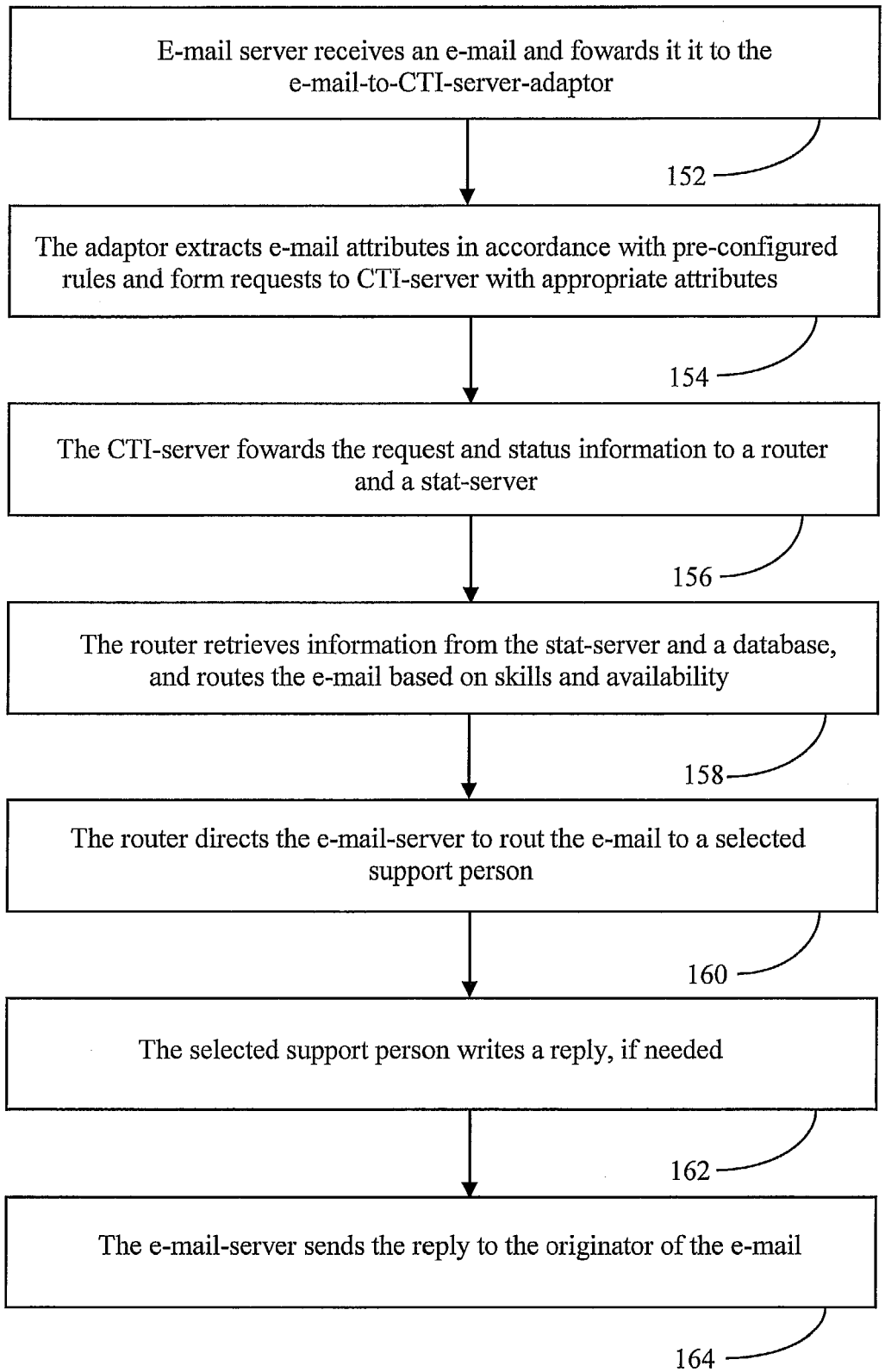
FIG. 3 is a flow chart showing operation of the server adapter used in the e-mail processing center of FIG. 1.

A flow chart 150 showing the operation of e-mail processing center 100 is shown in FIG. 3. In step 152, e-mail server 102 receives an e-mail. The e-mail is forwarded to e-mail-to-CTI-server adapter 110. In step 154, adapter 110 extracts e-mail attributes in accordance with pre-configured rules (embodied in extraction algorithm 208). It also sends status information and formulates requests to CTI server 130 using appropriate extracted attributes. In step 156, CTI-server 130 forwards the request and status information to router 116 and stat-server 112. In step 158, router 116 retrieves information from stat-server 112 and database 114 so as to make routing decision. In step 160, router 116 instructs e-mail server 102 to route the e-mail to the computer terminal used by a selected support person, such as computer 122. Because the instructions from router 116 may be coded in telephony-related commands, these instructions may need to pass through CTI-router 130, deformatter 210 and e-mail interface 202. Upon receiving the e-mail, the support person processes the e-mail using computer 122. If there is a need to send a reply, the support person writes the reply (step 162), and directs e-mail server 102 to deliver the reply to a recipient connected to data network 104 (step 164).

In addition to providing basic routing function, router 116 may also have a strategy to handle exception situations. For example, if an incoming mail is not answered by the selected support person within a predetermined time interval (e.g., three days), the mail is re-routed to another qualified and available support person. This strategy prevents mails from being dropped. As another example, there may be times when the number of incoming mails exceeds the available resource to answer these mails (i.e., overflow). Router 116 could store these mails in a queue and direct e-mail server 102 to alert senders that it may take a little longer to receive a reply.

It should be noted that if router 116, stat-server 112 and database 114 are designed strictly for e-mail applications, there is no need to have CTI server 130, formatter 210 and formatter 214. In this case, router 116, stat-server 112 and database 114 can communicate with e-mail server 102 and information extractor 204 directly.

Pre-routing and Treatment of Mixed Media

In one aspect of the present invention, the inventor provides a mixed media pre-routing system that intercepts and disseminates communication events, determines the priority of those events and pre-treats lesser priority events leaving higher priority events to actual agent-level routing. These communication events are to be understood in the broadest sense, and may include but are not limited to regular PSTN phone calls, IP phone calls, e-mails, chat, IMPP, SMS, voice chat, chat, chat relay, etc.

Figure 4:
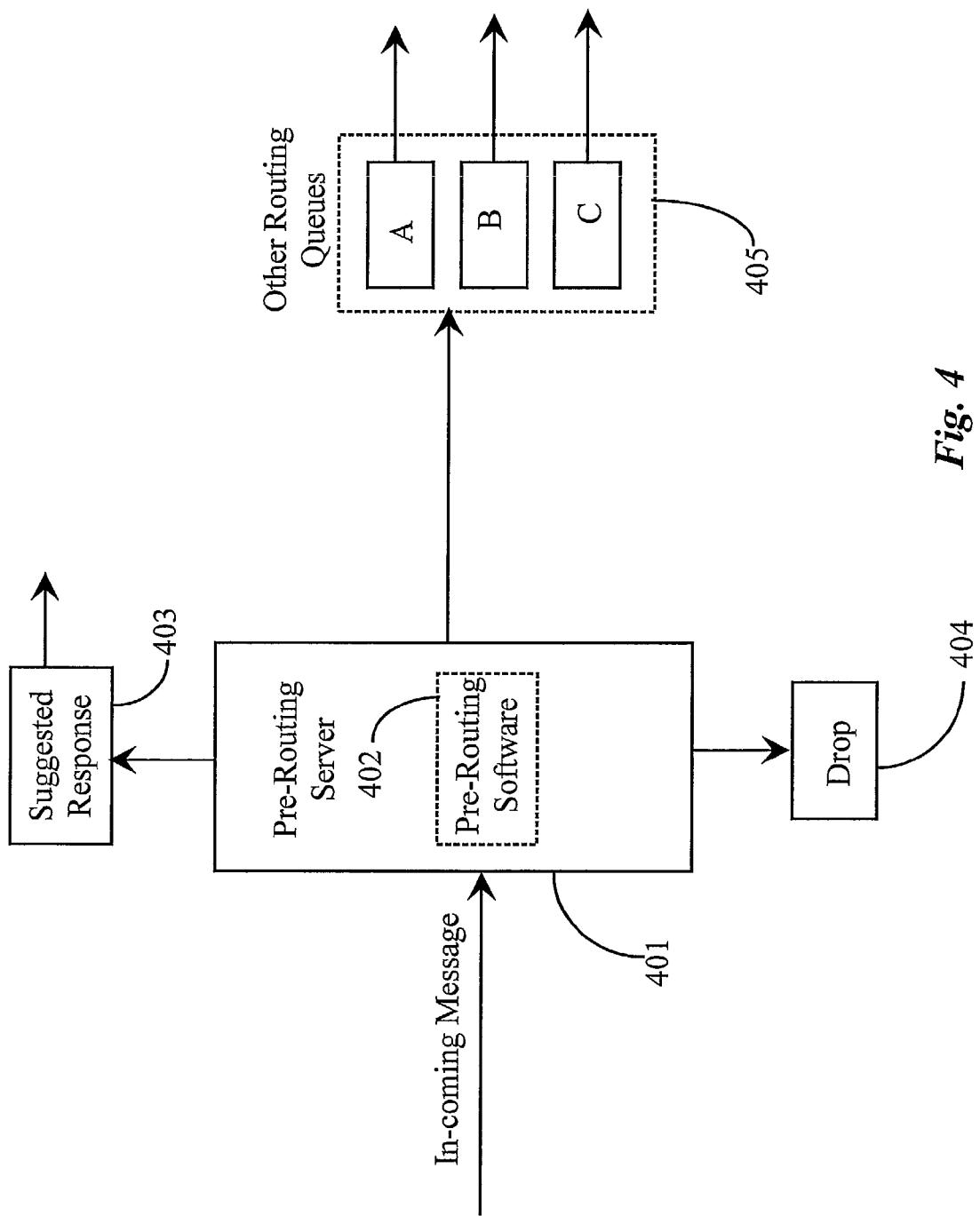
FIG. 4 is a block diagram illustrating a pre-routing and queuing system according to an embodiment of the present invention.

FIG. 4 is a block diagram illustrating a pre-routing and queuing system according to an embodiment of the present invention. A pre-routing server 401 is provided for the purpose of intercepting incoming events for pre-routing processing. The system of the present invention is, in a preferred embodiment, implemented within a communication center capable of receiving media from both data networks and the well-known PSTN network. In an embodiment wherein connection-oriented switched-telephony (COST) events are bridged to a data network, typically the Internet, before arrival at the communication center, then the entire system may be implemented at network level.

Server 401 is adapted by one universal interface or event-specific separate interfaces (not shown) to receive e-mail events, instant message events according to instant message presence protocol (IMPP), IP telephony events, electronic facsimile events, and IP events representing incoming COST calls. Server 401 may be assumed to be ported for and software-adapted for receiving all such communication events.

A pre-routing software instance 402 is provided and implemented within server 401. Software 402 is adapted to assimilate incoming events regardless of protocol and to apply a pre-defined set of qualification rules that help to determine an importance level for each individual event intercepted. For example, an information extractor including an extraction algorithm and parser engine as represented further above with respect to FIG. 2 would be part of software 402. Such capability is used to parse electronic message events such as e-mails, electronic fax documents and instant messages. Software 402 is also adapted to communicate with and glean information from automated systems such as COST-connected IVR systems and other intelligent peripherals such as stat servers and so on. In addition to the above-mentioned capabilities, software 402 has communication access to various messaging queues represented in this example as message queues A, B, and C enclosed in a queuing system 405 illustrated as a dotted rectangle.

Software 402 pre-routes message events according to a set of pre-defined rules for pre-routing that when applied to a message event, prioritize the event for one of three possible options. One option is represented in this embodiment as a box labeled suggested response 403. Response 403 is an automated response from one of various possible automated response systems that may be incorporated within a given communication center. For example, response 403 may be a generated facsimile response, an automated e-mail response, an automated IMPP response, an automated COST call-back, and so on.

Generation of option (response) 403 as a result of assimilation of an incoming event infers that the event was determined to be important enough for automated response, but not important enough to route to a live agent for treatment under the systems workload of events at the time of receipt of the particular event. In this case, the incoming event is not forwarded into any of queues A, B, or C organized within queuing system 405.

A second option is illustrated as a box labeled Drop and given the element number 404. Drop option 404 infers that after assimilating a particular incoming event, it was not determined to be important enough according to applied rules under existing message load for agent level routing or for automated response. In this case the event is simply dropped as the label of box 404 implies. In the case of a drop option, the nature of the physical option will of course depend on the type of media of the particular incoming event. For example, in the case of a bridged COST call, an IVR response may proceed the actual physical disconnect informing the caller to try the call again later. For an e-mail or an instant message, a courtesy response may inform the sender that currently the system is overloaded or the server is down (message undeliverable). There are many possible drop scenarios.

The third option is forwarding the incoming message to an appropriate agent queue represented by queues A-C within system 405. The third option infers that the event is of importance to the communication center in terms of positive effect on the center, most probably profit-based effect. For example, an automated order message for agent processing, a call request to order products, a call request to arrange payment for services previously rendered and so on. The exact criteria for an event to receive actual agent-level routing will depend on the type of business implementing the pre-routing system and the rules applied.

In one embodiment of the invention, the option for agent-level routing may be further optimized for priority. For example, assume queues A, B, and C are segregated in order of customer class, for example, in an airline embodiment where first class client requests are en-queued in queue A, second class requests are en-queued in queue B and economy class client requests are en-queued in queue B. Likely, queue A will enjoy the fastest response time, while queues B and C have longer response times respectively. In this case, if the message load is very large, automated responses can be used for intercepts that are simply inquiries for information (no purchase information), and drops can be initiated for third party flight information requests, complaints, and all other customer service requests where no foreseeable benefit in terms of profit or other advantage would be realized by the airline by servicing the particular request.

The system of the present invention can be integrated with existing routing and message treatment systems already in operation at a communications site. For example, if an e-mail routing system is in place alongside a separate telephony routing system and an IP voice and/or live-message routing system, then the system of the present invention would be a front-end system implemented between the various real queues and agent communication systems. Virtual queues adhering to the pre-routing rule set can be implemented for the purpose of prioritizing events such that priority notification can be sent to agents ahead of time informing the agents of which events and corresponding media types to respond to. Actual or real message queuing would follow the virtual directives including generation of pre-routing responses from automated systems and drops.

Figure 5:
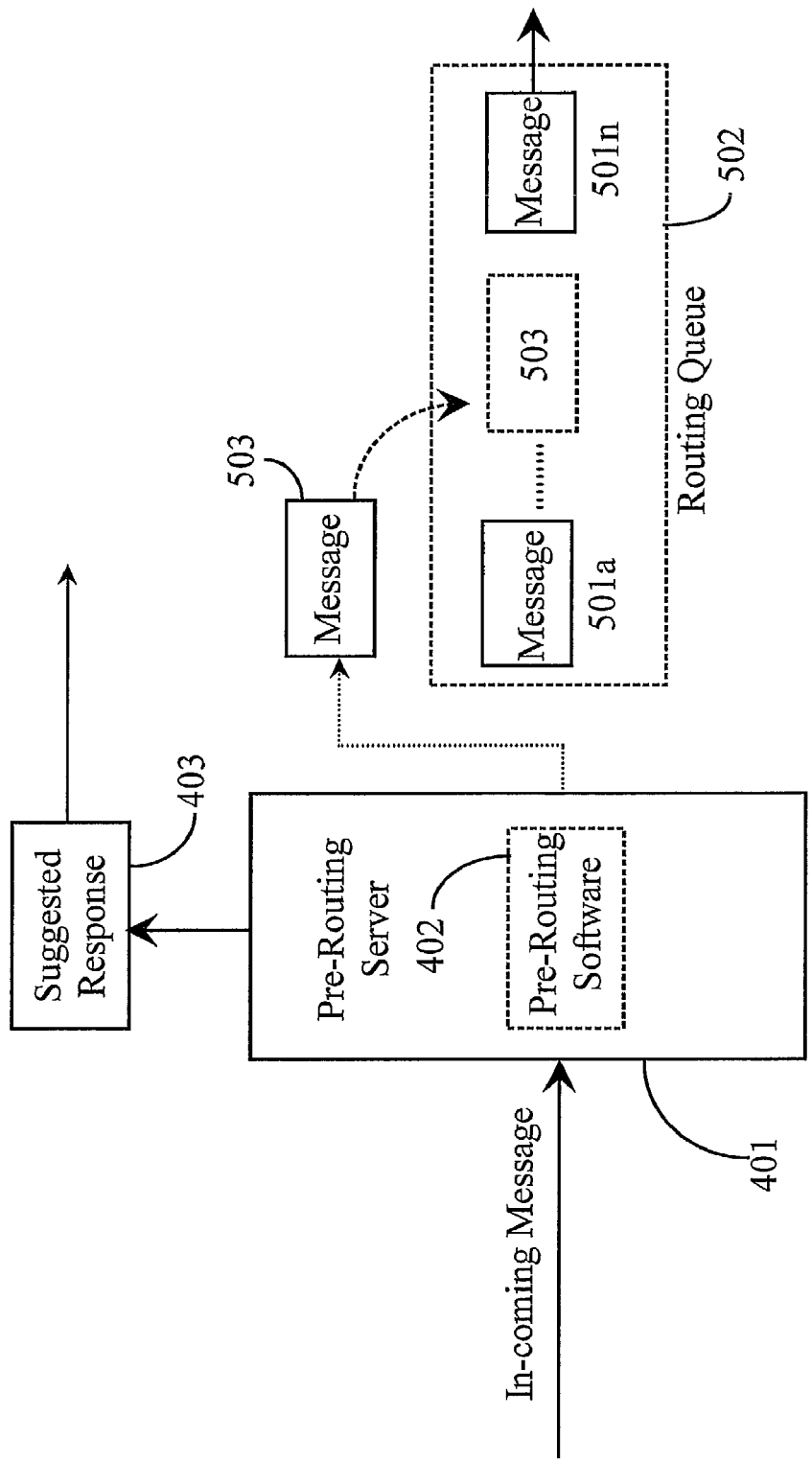
FIG. 5 is a block diagram illustrating implementation of the system of FIG. 4 with a priority-based universal virtual queue 502 according to an embodiment of the present invention.

FIG. 5 is a block diagram illustrating implementation of the system of FIG. 4 with a priority-based universal virtual queue 502 according to an embodiment of the present invention. Elements illustrated in this example that have already been introduced with respect to description associated with the example of FIG. 4 are not re-introduced and retain their element numbers from FIG. 4.

In this example, a single virtual queue 502 is provided ahead of any actual routing systems or agent-level queues. Queue 502 is universal in that it queues all events deemed important enough for eventual agent-level routing. Queue 502 is priority based, meaning that tokens representing actual events may be en-queued in any specific position deemed appropriate either ahead of or behind other already en-queued events. As a virtual queue, queue 502 represents more of a directive or instruction to agents in regard to which events actually queued or waiting switches should be attended first and then next and so on.

Server 401 and software 402 operate very much as described with reference to FIG. 4 above accept that in this example, software 402 controls en-queuing operations with respect to virtual queue 502. This process can be accomplished with a pre-route software controller (not shown) that would be integrated with software 402. For example, events 501a through 501n in this example represent events already en-queued according to response priority with a first-in-first-out theme that is well known in the art. Incoming events that are deemed not important enough for virtual en-queuing are either given an automated response or dropped altogether as was described with reference to FIG. 4 above. However, if it is deemed that a message should be en-queued ultimately for agent-level routing, then software 402 will determine where (what queue position) in queue 502 the message will be placed.

In this example, a message for enquiring into virtual queue 502 is represented by a box labeled Message and given the element number 503. Message 503 can be a message of any media type including regular telephone and automated transfer machine (ATM) type events. Queue 502 simply holds a position for message 503, which is represented as being en-queued into queue 502 between message 501n and message 501a. Simply explained, it has been determined by software 402 that message 503 is more important that message 501a but less important than message 501n. It is noted herein and illustrated by dotted line that server 401 inserts message 503, represented as a dotted box labeled with the foresaid element number 503.

As iterated above, events 501a-n as well as message 503 can be of varied media types and are simply tokenized in this representation. Applicable media types include but are not limited to e-mail, instant messages, electronic faxes, electronic documents, Internet protocol telephony events, automated transfer machine events, Internet protocol video-enhanced events, and electronic notifications of connection-oriented-switched-telephony events.

In one embodiment, queue 502 contains actual messages and call notifications and empties into appropriate agent queues that are individualized to each agent.

It is noted herein that the pre-routing system of the present invention uses minimum parsing and rule comparison in order to determine pre-routing options for events. For example, in one embodiment only a caller ID is referenced against statistics surrounding the caller. For example, if a particular ID returns negative information such as "slow payer", then perhaps an automated response might be chosen for that caller during heavy event workloads.

In another embodiment, incoming events may, for example, be customer reactions to a special promotion wherein they are told to include a product code or special word or phrase in their message. When their responses come in the software looks for the key codes, phrases or words assuming of course that the reactive event is likely to be a purchase order. In particularly heavy traffic conditions, perhaps only those events would get live treatment from agents.

In still another embodiment, a gatekeeper (not shown) could be provided on the agent side of pre-routing server 401 and be adapted as an additional screening mechanism. In this case, all events having a special code or pre-set phrase are sent to the gatekeeper, which then filters the events further, perhaps using client history data to determine which events are more important to route to agents.

Referring now to FIG. 1, pre-routing server 401 would be implemented between adaptor 110 and router 116 and would have access to all machines connected to LAN 128. Moreover, pre-routing server 401 would have additional connection with network routing apparatus and automated systems (not shown). In a virtual queue embodiment, separate types of media would not have to be en-queued in media specific queues until the point of interaction with an agent after agent-level routing has been approved and performed. Information from the virtual queue position of each event can be used to direct the agent in pursuing his or her responses and treatments with regards to which queues to work from etc. There are many possibilities.

The invention has been described with reference to exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A pre-routing software system for treating incoming network events according to event importance prior to agent-level routing in a communication center network comprising:
   at least one network interface for receiving incoming events including at least electronic messages and documents;
   a parsing engine for parsing the electronic messages and documents;
   at least one communication interface for enabling communication with connected routing, queuing, and automated response systems; and
   a determination module for determining pre-treatment of received events wherein pre-treatment includes forwarding the received event to any one of the routing, queuing, and automated response systems and;
   characterized in that the incoming network events are parsed according to a rules set and wherein determination of pre-treatment is made for each event according to the rules set.

2. The system of claim 1 wherein the communication-center network comprises two or more communication centers linked for communication and wherein the pre-routing is performed in the network.

3. The system of claim 1 wherein the communication-center network is internal to a single communication center and the pre-routing is performed within the communication center.

4. The system of claim 1 wherein the communication-center network is internal to a single communication center and a pre-routing is performed externally from the communication center.

5. The system of claim 1 wherein network events include e-mail, instant messages, electronic faxes, electronic documents, Internet protocol telephony events, automated transfer machine events, Internet protocol video-enhanced events, and electronic notifications of connection-oriented-switched-telephony events.

6. The system of claim 1 wherein the queuing system is a virtual queuing system.

7. The system of claim 1 wherein the automated response systems include an automated fax system, and automated e-mail system, and an automated interactive-voice-response system.

8. The system of claim 1 wherein pre-treatment options include dropping the event, routing to an automated response system, and routing to a live agent.

9. A pre-routing server for determining treatment of incoming network events to a communication-center network prior to agent-level routing comprising:
   at least one input port for receiving the events;
   at least one communications port for communicating to external and connected systems of the communication-center network; and
   an instance of pre-routing software for parsing the network events and for determining treatment for each event based on the results of parsing;
   characterized in that according to importance level of each event as determined through parsing results according to a set of rules, events are either terminated, routed to automated response systems, or routed to communication center agents.

10. The server of claim 9 wherein the communication-center network comprises two or more communication centers linked for communication and wherein the pre-routing is performed in the network.

11. The server of claim 9 wherein the communication-center network is internal to a single communication center and the pre-routing is performed within the communication center.

12. The server of claim 9 wherein the communication-center network is internal to a single communication center and a pre-routing is performed externally from the communication center.

13. The server of claim 9 wherein network events include e-mail, instant messages, electronic faxes, electronic documents, Internet protocol telephony events, automated transfer machine events, Internet protocol video-enhanced events, and electronic notifications of connection-oriented-switched-telephony events.

14. The server of claim 9 wherein the automated response systems include an automated fax system, and automated e-mail system, and an automated interactive-voice-response system.

15. A method for pre-routing network events incoming into a communication-center network according to importance level of each event comprising steps of:
   (a) receiving at least one network event for pre-routing including at least electronic messages and documents;
   (b) parsing the event electronic messages and documents according to a set of rules;
   (c) determining a treatment option for the event according to results of parsing and application of rules set, said treatment option including forwarding the received event to any one of a routing, queuing, and automated response systems; and
   (d) exercising elected treatment option for the event.

16. The method of claim 15 wherein in step (a) the network event is one of an e-mail, instant messages, electronic fax, Internet protocol telephony event, automated transfer machine event, Internet protocol video-enhanced event, or an electronic notification of a connection-oriented-switched-telephony event.

17. The method of claim 15 wherein in step (b) the set of rules is predefined and applies to all events.

18. The method of claim 15 wherein in step (b) a set of rules pertains to specific media type.

19. The method of claim 15 wherein in step (b) the set of rules is dynamic.

20. The method of claim 15 wherein in step (c) the treatment options include dropping the event, routing the event to an automated system, or routing the event to a live agent.

* * * * *